United States Patent
Maki et al.

(10) Patent No.: US 11,044,362 B2
(45) Date of Patent: Jun. 22, 2021

(54) TELEPHONE EXCHANGE SYSTEM AND TELEPHONE EXCHANGE APPARATUS AND METHOD, NON-TRANSITORY COMPUTER READABLE MEDIUM STORING PROGRAM

(71) Applicants: NEC Platforms, Ltd., Kanagawa (JP); NIPPON TELEGRAPH AND TELEPHONE EAST CORPORATION, Tokyo (JP); NIPPON TELEGRAPH AND TELEPHONE WEST CORPORATION, Osaka (JP)

(72) Inventors: Hideo Maki, Kanagawa (JP); Takashi Ando, Tokyo (JP); Yasuaki Kaneda, Osaka (JP)

(73) Assignees: NEC Platforms, Ltd., Kawasaki (JP); NIPPON TELEGRAPH AND TELEPHONE EAST CORPORATION, Tokyo (JP); NIPPON TELEGRAPH AND TELEPHONE WEST CORPORATION, Osaki (JP)

(*) Notice: Subject to any disclaimer, the term of this patent is extended or adjusted under 35 U.S.C. 154(b) by 244 days.

(21) Appl. No.: 16/305,157

(22) PCT Filed: Oct. 4, 2017

(86) PCT No.: PCT/JP2017/036145
§ 371 (c)(1),
(2) Date: Nov. 28, 2018

(87) PCT Pub. No.: WO2018/179525
PCT Pub. Date: Oct. 4, 2018

(65) Prior Publication Data
US 2020/0322481 A1    Oct. 8, 2020

(30) Foreign Application Priority Data
Mar. 31, 2017    (JP) .............................. JP2017-069603

(51) Int. Cl.
*H04W 40/02*    (2009.01)
*H04M 3/42*    (2006.01)
*H04M 7/00*    (2006.01)

(52) U.S. Cl.
CPC ... *H04M 3/42042* (2013.01); *H04M 3/42059* (2013.01); *H04M 7/0027* (2013.01); *H04M 2203/558* (2013.01)

(58) Field of Classification Search
CPC ......... H04M 2203/558; H04M 7/0027; H04M 3/42059; H04M 3/42042
See application file for complete search history.

(56) References Cited

U.S. PATENT DOCUMENTS

2003/0043982 A1* 3/2003 Lee .......................... H04Q 3/72
379/142.01
2003/0095542 A1* 5/2003 Chang ................ H04M 7/0057
370/352

(Continued)

FOREIGN PATENT DOCUMENTS

JP    11-018148 A    1/1999
JP    2002-057795 A    2/2002

(Continued)

OTHER PUBLICATIONS

Communication dated Oct. 1, 2019 by the Canadian Intellectual Property Office in application No. 3025891.

(Continued)

*Primary Examiner* — Dai Phuong
(74) *Attorney, Agent, or Firm* — Sughrue Mion, PLLC

(57) ABSTRACT

Terminal information of a mobile terminal via the Internet is transmitted, and an outgoing reservation is made. Along (Continued)

with this, terminal information of a mobile terminal is transmitted from a telephone network to a telephone exchange apparatus of a company. The telephone exchange apparatus checks the terminal information of a call originator mobile terminal for which an outgoing call is reserved via the Internet against call originating terminal information arrived via the telephone network, and when the call originator terminal information arrived via the telephone network can be authenticated, the reserved call destination terminal is called with the company exchange apparatus as a call originator. When a user calls a customer from his/her mobile terminal phone, a telephone number of the personal mobile terminal is not displayed on a call destination terminal. Further, no troublesome operation for callback is required, and the communication cost charged to a company is reduced.

8 Claims, 4 Drawing Sheets

(56) References Cited

U.S. PATENT DOCUMENTS

| | | | | |
|---|---|---|---|---|
| 2006/0222159 A1* | 10/2006 | Yoshihara | ......... | H04M 3/42042 379/219 |
| 2006/0229054 A1* | 10/2006 | Erola | ...................... | H04M 3/51 455/403 |
| 2012/0177029 A1* | 7/2012 | Hillier | ................. | H04L 65/1069 370/352 |
| 2012/0321066 A1* | 12/2012 | Keast | ................ | H04W 12/0431 379/221.14 |
| 2013/0308766 A1 | 11/2013 | Chmara et al. | | |
| 2016/0234389 A1 | 8/2016 | Czachor, Jr. et al. | | |
| 2017/0048389 A1* | 2/2017 | Omi | ................... | H04M 3/42314 |
| 2018/0034964 A1* | 2/2018 | McComb | ............ | G06F 16/2455 |
| 2019/0246279 A1* | 8/2019 | Byrne | ................... | H04W 12/08 |

FOREIGN PATENT DOCUMENTS

| | | |
|---|---|---|
| JP | 2005-057418 A | 3/2005 |
| JP | 5318665 B2 | 10/2013 |

OTHER PUBLICATIONS

"Telephone Exchange System and Telephone Exchange Apparatus, Method and Program" (Firmware V0300), Technical Support News No. 16-24—published in the webpage for NTT West's Distributors as well as in the dedicated website of NTT West for Distributors and personnel of the Vendors—(Oct. 5, 2016).

"Telephone Exchange System and Telephone Exchange Apparatus, Method and Program" (Firmware V0301), HotNews!! HN28-041—published in the webpage for NTT East's Distributors as well as in the dedicated website of NTT East for Distributors and personnel of the Vendors—(Oct. 28, 2016).

International Search Report of PCT/JP2017/036145 dated Dec. 19, 2017 [PCT/ISA/210] English Translation.

* cited by examiner

TELEPHONE EXCHANGE SYSTEM AND TELEPHONE EXCHANGE APPARATUS AND METHOD, NON-TRANSITORY COMPUTER READABLE MEDIUM STORING PROGRAM

CROSS REFERENCE TO RELATED APPLICATIONS

This application is a National Stage of International Application No. PCT/JP2017/036145, filed Oct. 4, 2017, claiming priority based on Japanese Patent Application No. 2017-069603, filed Mar. 31, 2017, the contents of all of which are incorporated herein by reference in their entirety.

TECHNICAL FIELD

The present invention relates to a telephone exchange system, a telephone exchange apparatus, a method, and a program.

BACKGROUND ART

Personally-owned smartphones have become widespread, and under the BYOD (Bring Your Own Device) policy, smartphones owned by individuals have been used for business purposes. However, when a person uses a personally-owned smartphone to call a customer while he/she is outside his/her office, the telephone number of the personal smartphone will become known to the customer as the caller ID, which may make the customer think that the phone call is a suspicious phone call. There is another problem that the telephone number of the smartphone, which is personal information, may leak out.

As the telephone number of the customer is recorded on the personally-owned smartphone, the telephone number of the customer may leak out if the smartphone is lost. There is a demand from companies for restriction of access to telephone numbers of customers in order to reduce the risk of leakage.

Patent Literature 1 discloses a technique of registering telephone numbers of customers in a customer database with restricted access instead of registering them in a smartphone and acquiring the telephone number to make a phone call to the customer via an exchange apparatus of a company.

CITATION LIST

Patent Literature

Patent Literature 1: Japanese Patent No. 5318665

SUMMARY OF INVENTION

Technical Problem

The above Patent Literature 1 accesses the customer database via the Internet to acquire a telephone number of a customer. However, Patent Literature 1 uses a callback system. In the callback system, a user calls a company while he/she is outside his/her office and disconnects the line while the callback system has detected the call in. Then, an exchange of the company calls the user back to connect the smartphone to the exchange of the company. After that, the exchange of the company makes an outgoing call to a telephone number of a customer acquired from the customer database to relay-connect the customer's telephone to the user's smartphone outside his/her office.

An advantage of the callback system is that the communication cost is at the company's expense and the user himself/herself is not charged for the communication. However, the callback system has a problem that the company is charged for two phone calls, i.e., a phone call made by the exchange of the company to the user's smartphone and a phone call made by the exchange of the company to connect the destination terminal to the user's terminal outside his/her office, thereby increasing the communication expense of the company. Another problem of the callback system is that after the user calls and disconnects the exchange of the company, he/she needs to answer an incoming call from the exchange of the company, which requires extra work and is a troublesome for the user.

A desired communication system is one that does not let another person at the other end of the line know a telephone number of a personally-owned smartphone and that reduces the communication cost charged to the company even when the personally-owned smartphone is used for business purposes to call someone while the user is outside his/her office.

An object of the present invention is to solve the above-mentioned problems. The present invention aims to provide a telephone exchange system, a telephone exchange apparatus, a method, and a program that, when a user calls a customer from his/her mobile terminal while he/she is outside his/her office, do not let the customer know a telephone number of the user's mobile terminal, requires no troublesome operation for callback, and reduces communication cost charged to a company.

Solution to Problem

A first example aspect of the present invention is a telephone exchange system. The telephone exchange system includes: a telephone exchange apparatus connected to a telephone network; a server connected to the Internet; a mobile terminal that is a call originator connected to the Internet and a telephone network; and a terminal that is a call destination connected from the telephone exchange apparatus via a telephone network. The mobile terminal includes: outgoing call reservation means for accessing the server via the Internet and making an outgoing call reservation with call destination terminal information of the terminal to be the call destination and terminal information of the mobile terminal as call originator terminal information; and calling means for calling the telephone exchange apparatus via the telephone network and transmitting the terminal information of the mobile terminal as the call originator terminal information. The telephone exchange apparatus includes: outgoing call reservation information registration means for registering the outgoing call reservation transmitted from the server; and call control means for checking the call originator terminal information from the mobile terminal against the call originator terminal information in the outgoing call reservation information, and when they match, transmitting a call signal of the terminal of the call destination terminal information in the outgoing call reservation information with the terminal information of the telephone exchange apparatus as the call originating terminal information.

A second example aspect of the present invention is a telephone exchange apparatus. The telephone exchange apparatus includes: outgoing call reservation information registration means for registering outgoing call reservation information including terminal information of a mobile terminal arrived via the Internet; and call control means for accepting an incoming call signal arrived from the mobile terminal via a telephone network, checking the terminal information of the incoming call signal against the terminal information of the mobile terminal in the registered outgoing call reservation information, and when they match, transmitting a call signal of the terminal of the call destination terminal information in the registered outgoing call reservation information with the terminal information of the telephone exchange apparatus as call originating terminal information.

A third example aspect of the present invention is a telephone exchange method. The telephone exchange method includes: an outgoing call reservation information registration step of registering outgoing call reservation information including terminal information of a mobile terminal arrived via the Internet; and a call control step of accepting an incoming call signal arrived from the mobile terminal via a telephone network, checking the terminal information of the incoming call signal against the terminal information of the mobile terminal in the registered outgoing call reservation information, and when they match, transmitting a call signal of the terminal of the call destination terminal information in the registered outgoing call reservation information with the terminal information of the telephone exchange apparatus as call originating terminal information.

Note that the functions of each of the mean of the telephone exchange apparatus can be achieved when installed in an information processing apparatus.

Advantageous Effects of Invention

When a user calls a customer from his/her mobile terminal, a telephone number of the personal mobile terminal is not displayed on a call destination terminal. Further, no troublesome operation for callback is required, and the communication cost charged to a company is reduced.

DESCRIPTION OF EMBODIMENTS

Hereinafter, an embodiment of the present invention will be described below with reference to the drawings.

Figure 1:
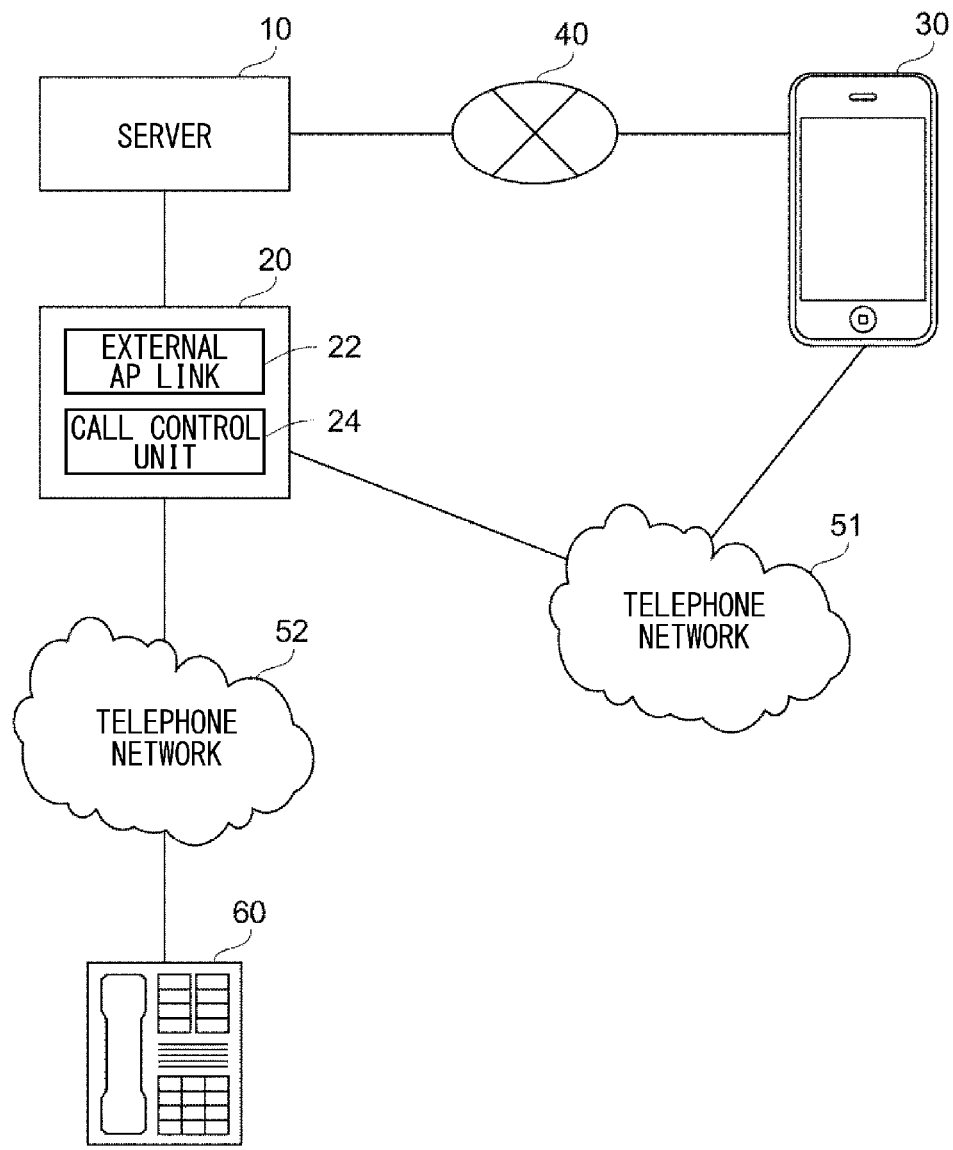
FIG. 1 is a view showing a configuration of a telephone communication method according to the present invention.

FIG. 1 is a view showing a configuration of a telephone exchange system according to the embodiment of the present invention. In this specification, an example in which a user makes an outgoing call to a customer's telephone (terminal) using his/her smartphone via a Private Branch eXchange (PBX) apparatus of a company while he/she is outside his/her office.

The telephone exchange system according to this embodiment includes a telephone exchange apparatus (PBX) 20 inside the company and a server 10 connected to the Internet 40. The user's smartphone 30 is connected to the Internet 40 and to a telephone network 51. The telephone network 51 here is a wireless telephone line network. Further, the telephone exchange apparatus 20 is connected to a telephone network 52, and can make an outgoing call to a call destination terminal 60. The call destination terminal 60 is a customer terminal to which the user intends to make a phone call.

Note that the telephone networks 51 and 52 are shown separately in order to give separate descriptions for an incoming call from the user's terminal to a customer and an outgoing call to the customer. The telephone network 51 is a wireless telephone line network from the relationship with the smartphone 30. The telephone network 52 is a telephone network for a call destination terminal and may be a landline telephone line or a wireless telephone line. The telephone networks 51 and 52 correspond to external lines when viewed from the telephone exchange apparatus 20.

The server 10 is connected to the Internet 40 which is a data communication network and represents a function of performing data processing. The server 10 has a URL and a function of accepting an outgoing call reservation from the user's smartphone 30 via the Internet 40.

The telephone exchange apparatus 20 is a common private branch exchange and can perform call control on a large number of extension terminals inside the company or call control of, for example, incoming and outgoing calls from external lines.

The smartphone 30 is owned personally by the user. Even this personally owned smartphone is permitted by the telephone exchange apparatus 20 to access the server 10 via the Internet, which is the data communication network, and call the call destination terminal 60 with the telephone number of the telephone exchange apparatus 20 as a call originator so that the smartphone 30 can be used to call the call destination terminal 60, which is the customer terminal, from the telephone exchange apparatus 20, when the smartphone 30 is used for business purposes.

An outline of a telephone connection according to this embodiment will be described.

When the user selects a customer using an application software of the smartphone 30, which is his/her mobile terminal, and makes an outgoing call, a customer telephone number, which is call destination terminal information, and a telephone number of the smartphone, which is call originating terminal information, are transmitted in a notification to the telephone exchange apparatus 20 of the company via the Internet. The telephone exchange apparatus 20, which has received the notification, accepts the notification from the telephone number of the smartphone 30, and registers it as an outgoing call reservation of the telephone of the call destination terminal, which is the customer terminal.

The application software of the smartphone 30 makes the above-mentioned outgoing call reservation via the Internet, and also makes an outgoing call to the telephone exchange apparatus 20 of the company via the telephone network 51, which is a wireless telephone line, and transmits a telephone number of the smartphone 30, as a caller ID, to the telephone exchange apparatus 20 of the company. The outgoing call reservation via the Internet 40 and the notification to the telephone exchange apparatus 20 via the telephone network 51 can be performed in a single selection operation of the application software.

The telephone exchange apparatus 20, which has received the incoming call from the smartphone 30, checks the outgoing telephone number transmitted via the telephone network 51 against the telephone numbers of the smartphones for which outgoing calls are reserved. When there is a match, the telephone exchange apparatus 20 makes an outgoing call to a terminal of the customer telephone number for which an outgoing call is reserved from a telephone number of the telephone exchange apparatus 20 as a call originating telephone number. Then, the telephone exchange apparatus 20 connects the destination terminal 60 which has answered the outgoing call to the smart phone 30 to relay the phone call between the smart phone and the call destination terminal.

First, an operation of outgoing call reservation control will be described. The user operates the smartphone 30 to activate the application software, connect the smartphone 30 to the server 10 via the Internet 40, and make an outgoing call reservation. At this time, the customer telephone number is not registered in the smartphone 30. Instead, the smartphone 30 is connected to the customer telephone number database in the server 10, and the user selects the telephone number of the customer to which he/she wishes to make a phone call. By this selection, the telephone number of the smartphone 30, specifically, the call originating telephone number and the call destination telephone number are accepted at the same time by the server 10 as an outgoing call reservation. This outgoing call reservation is transmitted to an external AP linking unit 22 of the telephone exchange apparatus 20 as an outgoing call reservation registration request. The smartphone 30 is owned personally by the user, and thus it is not preferable to accumulate customer information in the personal terminal, because it may be leaked out if the smartphone is lost. It is thus preferable to store the customer information in the server 10 side instead of storing it in the smartphone. It is obvious that the smartphone 30 may transmit a set of the call destination telephone number of the call destination terminal 60 for which the user wishes to make an outgoing call reservation and the call originating telephone number in order to make the outgoing call reservation. Although the server 10 is shown as a separate component from the telephone exchange apparatus 20 in FIG. 1, the telephone exchange apparatus 20 can be configured to include an internet function. In such a case, the internet function can be recognized as a server function connected to the Internet of the telephone exchange apparatus 20.

Figure 2:
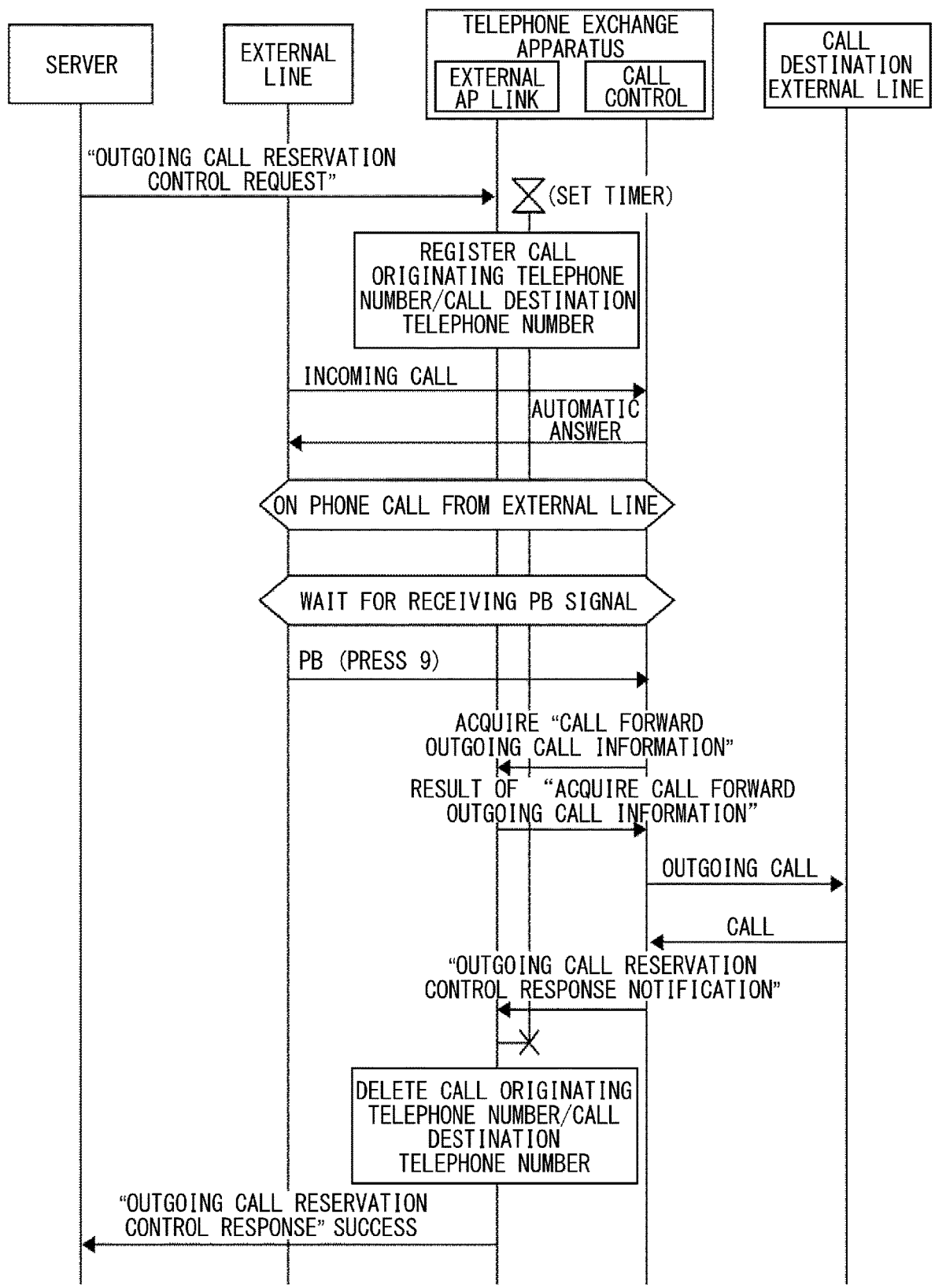
FIG. 2 is a view showing a sequence of call forwarding by outgoing call reservation control according to an embodiment of the present invention.
Figure 3:
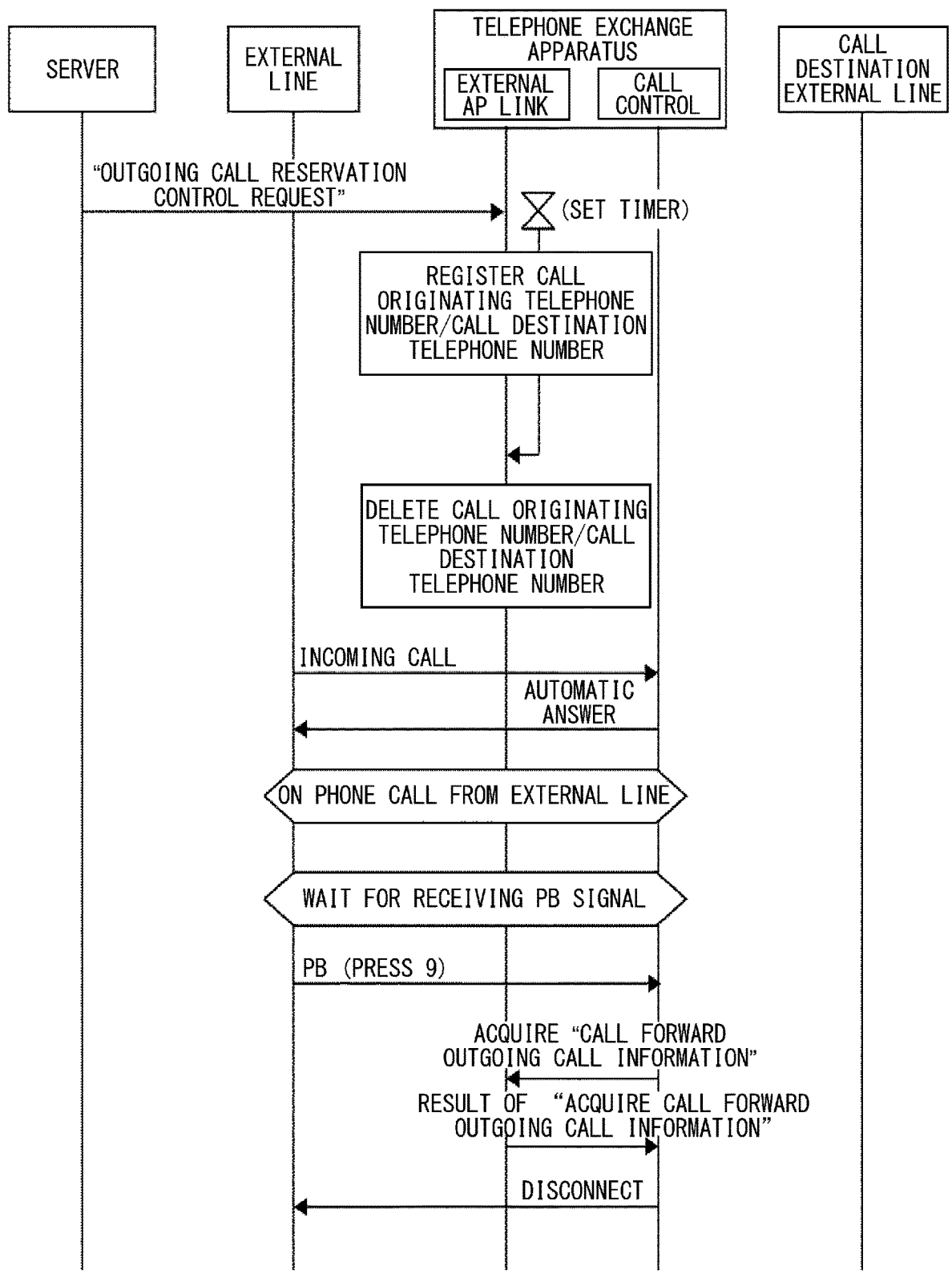
FIG. 3 is a view showing a sequence when there are duplicate outgoing call reservations according to the embodiment of the present invention.

Next, the call control of the customer terminal by the outgoing call reservation in the telephone exchange apparatus 20 will be described with reference to FIGS. 2, 3, and 4. Here, the calling of the call destination terminal by the outgoing call reservation is referred to as an advance call and is also referred to as call forwarding. FIG. 2 is a sequence diagram showing a call forwarding operation of the telephone exchange apparatus 20 by the outgoing call reservation.

When a notification of the outgoing call reservation arrives at the server 10 from the smartphone 30 via the Internet while the telephone exchange apparatus 20 is servicing the call forwarding by the outgoing call reservation, data of this notification causes the server 10 to issue an outgoing call reservation control request to the external AP linking unit 22 of the telephone exchange apparatus 20. The external AP linking unit 22 checks a parameter of the outgoing call reservation control request and rejects to accept the request when the parameter is invalid. The parameter is invalid, for example, when the number of registrations has been exceeded, or the call destination is an extension number and cannot be called.

When the external AP linking unit 22 accepts this outgoing call reservation control request, it activates a call forward outgoing call accept timer and registers call forward outgoing call information with a set of the call destination telephone number and the call originating telephone number. The timer is set to 60 seconds.

When the outgoing call reservation control request is transmitted, shortly after that or at almost the same time, an incoming call from an external line is made from the smartphone 30 to the call control unit 24 via the telephone network 51. At this time, the call control unit 24 checks the call originating telephone number from the telephone network through which the incoming call from the external line is made against the call originating telephone number of the outgoing call reservation control request. When they match, the call control unit 24 waits for a reception of the PB signal to wait for an input of a service number for instruction of an outgoing call under the outgoing call reservation control. This is because when the button 9 is pressed as the PB signal, it can be confirmed that the outgoing call is a reservation outgoing call. When the PB signal is input, the call control unit 24 acquires the call destination telephone number to acquire call forward outgoing call information registered in the external AP linking unit 22, captures the call destination external line, and calls the call destination telephone number. At this time, the telephone number of the telephone exchange apparatus, which is the telephone number of the company, is used as the call originating telephone number, and the telephone number of the smartphone 30 is not used as the call originating telephone number.

When a call signal arrives from the call destination terminal, the call control unit 24 transmits an outgoing call reservation control response notification to the external AP linking unit 22. In response to this notification, when the call forward outgoing call accept timer expires, the external AP linking unit 22 resets the timer and deletes the registration of the call originating telephone number and the call destination telephone number, which are the registered call forward outgoing call information and transmits an outgoing call reservation control response success notification to the server 10.

In the sequence described above, when the call signal of the call destination terminal arrives, the outgoing call reservation control response is regarded as successful and the registration is deleted. However, in order to prepare for calling again when the destination terminal does not answer, the registration may not be deleted immediately, and the call destination terminal may be called again. In the above sequence, the user waits for the PB signal to confirm the outgoing call by the outgoing call reservation. However, it is not necessary to wait for the PB signal and instead an outgoing call may be made to the call destination terminal in one operation of a smartphone.

The above-described number of the outgoing call reservation control registrations is determined by the number of terminals controlled by the telephone exchange apparatus 20. This number may be, for example, about 100. Further, a pair of the call destination telephone number and the call originating telephone number is registered. As shown in the sequence of FIG. 3, when there are a plurality of outgoing call reservation control notifications for call destination telephone numbers from one outgoing telephone number one after another, the call destination telephone number that comes later than another such number is registered as effective, and the information of the call destination telephone number that has come before that of another such number and has been registered is deleted.

Figure 4:
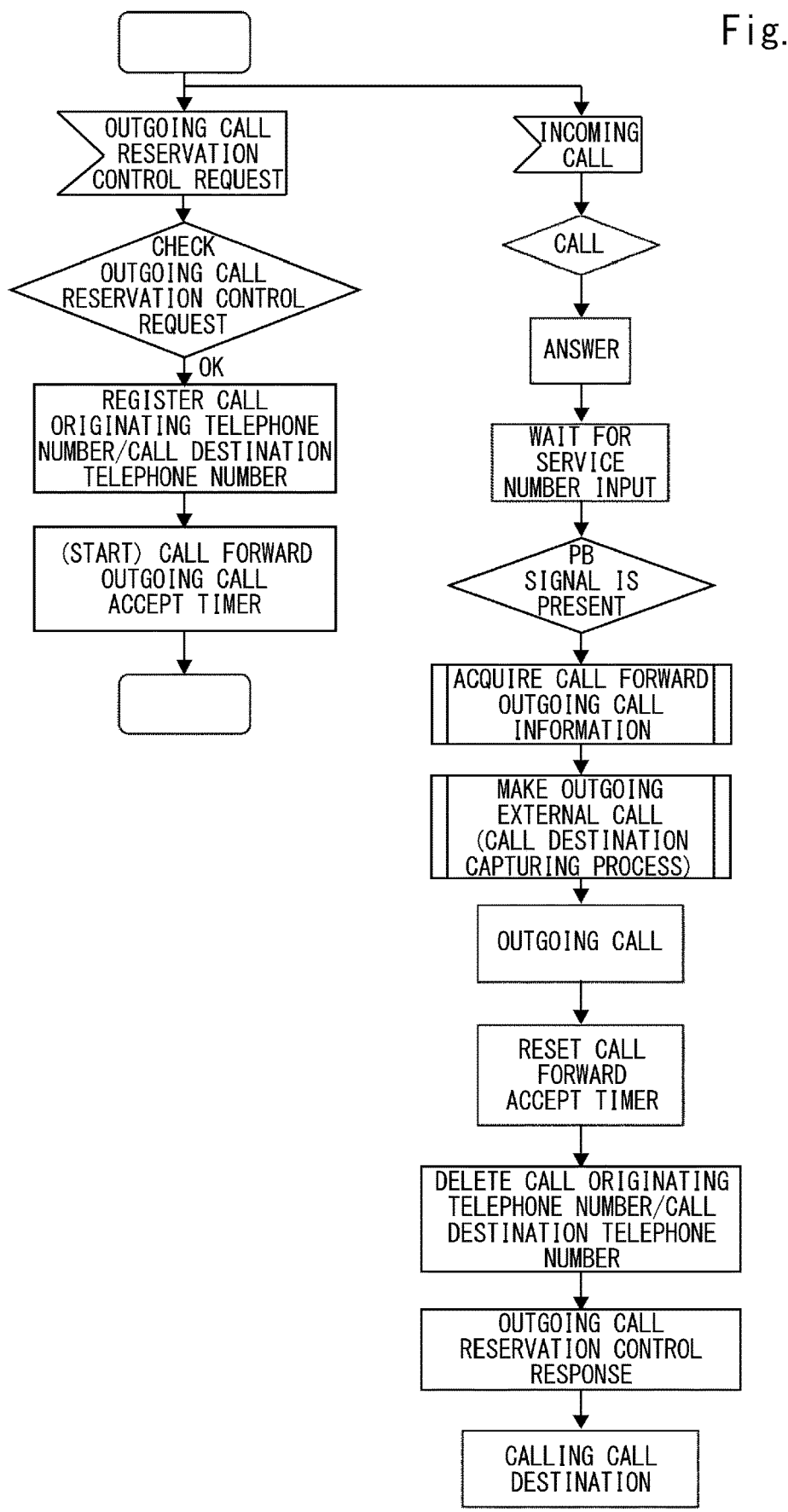
FIG. 4 is a flowchart for explaining an operation of the embodiment of the present invention.

FIG. 4 is a flowchart showing the sequence of FIG. 2. FIG. 4 shows parallel processing of call forwarding at the telephone exchange apparatus when outgoing calls for outgoing call reservations from the user's smartphone arrived at almost the same time or at slightly different times via two paths, i.e., via the Internet 40 and via the telephone network 51. In this embodiment shown in FIGS. 2 and 3, the incoming call from the telephone network is slightly delayed until after the incoming call from the Internet. However, as the smartphone 30 can give an instruction for the call forwarding by the outgoing call reservation in one operation, a signal for the outgoing call reservation and a signal for the external line incoming call from the smartphone 30 may arrive at the telephone exchange apparatus 20 at almost the same time or the signal for the external line incoming call may arrive at the telephone exchange apparatus 20 before the signal for the outgoing call reservation does. In such a case, in the processing of the call forwarding, the call originating telephone numbers which arrived via the two paths are checked, and then the call destination terminal is called. Thus, there is no change from the above-described sequence.

A flat rate wireless telephone line is used as the telephone network 51 according to this embodiment. Since the callback scheme is not used in this embodiment, the individual user who has made a contact is charged for the phone call. However, by using the flat rate communication line, the call charges for the individual user can be made inexpensive when call charges on the work that should be charged to the company are set at the flat rate. In addition, by using the flat rate communication line, the refund from the company for the call charges can be fixed at a certain amount.

In the related art, when the user calls the customer terminal from his/her mobile terminal while he/she is outside his/her office, there has been the inconvenience that the telephone number of the personally-owned telephone number is transmitted to the customer terminal. However, as described above, this inconvenience is eliminated, and the troublesome operation for the callback is also eliminated.

In the above embodiment, the present invention has been described as a hardware configuration. However, the present invention is not limited to this. The present invention can also be achieved by causing a CPU (Central Processing Unit) to execute a computer program of specified processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been described with reference to the embodiment, the present invention is not limited by the above. Various changes that can be understood by those skilled in the art within the scope of the invention can be made to the configuration and details of the present invention.

REFERENCE SIGNS LIST

10 SERVER
20 TELEPHONE EXCHANGE APPARATUS
22 EXTERNAL AP LINKING UNIT
24 CALL CONTROL UNIT
30 SMARTPHONE
40 INTERNET
51, 52 TELEPHONE NETWORK
60 CALL DESTINATION TERMINAL

The invention claimed is:

1. A telephone exchange system comprising:
a telephone exchange apparatus connected to a telephone network;
a server connected to the Internet;
a mobile terminal that is a call originator connected to the Internet and a telephone network;
a terminal that is a call destination connected to the mobile terminal from the telephone exchange apparatus via the telephone network,
wherein
the mobile terminal comprises:
first hardware including a first processor and a first memory;
an outgoing call reservation unit implemented at least by the first hardware, the outgoing call reservation unit configured to
access the server via the Internet and
make an outgoing call reservation with
terminal information of the terminal to be the call destination as call destination terminal information and
terminal information of the mobile terminal as call originator terminal information; and
a calling unit implemented at least by the first hardware, the calling unit configured to call the telephone exchange apparatus via the telephone network and transmit the terminal information of the mobile terminal as the call originator terminal information,
the telephone exchange apparatus comprises:
second hardware including a second processor and a second memory;
an outgoing call reservation information registration unit implemented at least by the second hardware, the outgoing call reservation unit configured to
register outgoing call reservation information related to the outgoing call reservation transmitted from the server;
a call forward outgoing call accept timer configured to be activated by the transmitted outgoing call reservation; and
a call control unit implemented at least by the second hardware, the call control unit configured to,
while the call forward outgoing call accept timer is activated,
check the call originator terminal information from the mobile terminal against the call originator terminal information in the outgoing call reservation information regardless of which of the two pieces of the call originator terminal information arrives first, and
when the two pieces of the call originator terminal information match,
transmit a call signal of the terminal of the call destination terminal information in the outgoing call reservation information with the terminal information of the telephone exchange apparatus as the call originating terminal information, and
the registration of the outgoing call reservation information and the transmission of the call signal of the terminal of the call destination terminal information in the outgoing call reservation information are performed by one instruction from the mobile terminal.

2. The telephone exchange system according to claim 1, wherein
when a signal for instructing the call control unit to call the call destination terminal by the outgoing call reservation arrives,
the call control unit transmits the call signal of the terminal of the call destination terminal information in the registered outgoing call reservation registration information.

3. The telephone exchange system according to claim 1, wherein
the server comprises a telephone directory database, and
the outgoing call reservation means of the mobile terminal comprises unit configured to
access the telephone directory database,
acquire the call destination terminal information, and
make the outgoing call reservation.

4. A telephone exchange apparatus comprising:
hardware including a processor and a memory;
an outgoing call reservation information registration unit implemented at least by the hardware, the outgoing call reservation information registration unit configured to
register outgoing call reservation information including terminal information of a mobile terminal transmitted via the Internet;
a call forward outgoing call accept timer configured to be activated by the transmitted outgoing call reservation information; and
a call control unit implemented at least by the hardware, the call control unit configured to,
while the call forward outgoing call accept timer is activated,
accept an incoming call signal arrived from the mobile terminal via a telephone network, check the terminal information, based on the incoming call signal, of the mobile terminal against the terminal information of the mobile terminal in the registered outgoing call reservation information regardless of which of the two pieces of the terminal information arrives first, and
when the two pieces of the terminal information match,
transmit a call signal, based on the call destination terminal information in the registered outgoing call reservation information, to the call destination terminal with the telephone number of the telephone exchange apparatus as call originating terminal information,
wherein
the registration of the outgoing call reservation information and the transmission of the call signal of the terminal of the call destination terminal information in the outgoing call reservation information are performed by one instruction from the mobile terminal.

5. The telephone exchange apparatus according to claim 4, wherein
when a signal for instructing the call control unit to call the call destination terminal by the outgoing call reservation arrives,
the call control unit transmits the call signal of the terminal of the call destination terminal information in the registered outgoing call reservation registration information.

6. A telephone exchange method comprising:
an outgoing call reservation information registration step of
registering outgoing call reservation information including terminal information of a mobile terminal transmitted via the Internet;
a call control step of,
while a call forward outgoing call accept timer activated by the transmitted terminal information is activated,
accepting an incoming call signal arrived from the mobile terminal via a telephone network, checking the terminal information, based on the incoming call signal, of the mobile terminal against the terminal information of the mobile terminal in the registered outgoing call reservation information regardless of which of the two pieces of the terminal information arrives first, and
when the two pieces of the terminal information match,
transmitting a call signal, based on the call destination terminal information in the registered outgoing call reservation information, to the call destination terminal with the telephone number of the telephone exchange apparatus as call originating terminal information; and
a step of
performing the registration of the outgoing call reservation information and the transmission of the call signal of the terminal of the call destination terminal information in the outgoing call reservation information by one instruction from the mobile terminal.

7. The telephone exchange method according to claim 6, wherein
when a signal for instructing to call the call destination terminal by the outgoing call reservation arrives, the call control step transmits the call signal of the terminal of the call destination terminal information in the registered outgoing call reservation registration information.

8. A non-transitory computer readable medium storing a program that causes an information processing apparatus to achieve functions of each of the mean of the telephone exchange apparatus according to claim 4 when installed in the information processing apparatus.

* * * * *